United States Patent [19]

Lasis et al.

[11] 4,070,340
[45] Jan. 24, 1978

[54] AMINE MODIFIED POLYMERS REACTED WITH HALOGEN COMPOUNDS

[75] Inventors: Evalds Lasis; Ernest Jack Buckler, both of Sarnia, Canada

[73] Assignee: Polysar Limited, Sarnia, Canada

[21] Appl. No.: 670,968

[22] Filed: Mar. 26, 1976

Related U.S. Application Data

[63] Continuation-in-part of Ser. No. 510,725, Sept. 30, 1974, Pat. No. 3,969,330.

[51] Int. Cl.$^2$ ............... C08C 19/14; C08C 19/22
[52] U.S. Cl. ........................... 260/47 UP; 260/52; 260/53 HA; 526/20; 526/21
[58] Field of Search ............... 260/47 UP, 52, 53 HA; 526/20, 21

[56] References Cited

U.S. PATENT DOCUMENTS

| 3,085,074 | 4/1963 | Burke et al. | 260/3.5 |
| 3,752,780 | 8/1973 | Petersen et al. | 260/25 |

*Primary Examiner*—John Kight, III
*Attorney, Agent, or Firm*—Stevens, Davis, Miller & Mosher

[57] ABSTRACT

Synthetic rubber compositions of improved green strength are prepared by incorporating in a synthetic rubber polymer, such as NBR or SBR, a small number of tertiary amine groups, and reacting this polymer with a halogen compound of general formula X—CH$_2$—R—CH$_2$—Y where X and Y represent chlorine, bromine or iodine, and R represents an aromatic group, and where X and Y are capable of forming quaternary ammonium salts with the tertiary amine groups on the polymer.

12 Claims, No Drawings

AMINE MODIFIED POLYMERS REACTED WITH HALOGEN COMPOUNDS

This application is a continuation-in-part of our co-pending application Ser. No. 510,725, filed Sept. 30, 1974, now U.S. Pat. No. 3,969,330.

This invention relates to synthetic rubber compositions useful for the manufacture of rubber goods and to processes for preparing such compositions.

The types of synthetic rubbers commonly used for making tires are styrene-butadiene copolymers in which butadiene predominates (SBR rubbers), polyisoprene and polybutadiene, and mixtures thereof. Whilst these polymers possess most of the desirable properties of a tire tread rubber, they are deficient in green strength. Green strength is a term applied to denote the strength, cohesiveness and dimensional stability of rubber compounds before they are cured or vulcanized. The lack of green strength of SBR, compared with that of natural rubber, is well known, and it has become a more acute problem with the advent of tires such as radial ties, in the manufacture of which the uncured (green) rubber composition has to withstand deformations of up to about 200% elongation without necking or uneven flow, and without rupture. Heretofore it has been common to provide the necessary green strength by mixing natural rubber with the synthetic rubber in the rubber composition.

Nitrile rubbers are also deficient in green strength. These rubbers, which are generally copolymers of butadiene (major proportion) and acrylonitrile, are oil resistant and are used in the manufacture of mechanical rubber goods, such as hose pipes and conveyor belting. In processing nitrile rubber compounds, lack of green strength can create problems, and it has generally been found necessary to use nitrile rubbers of high Mooney for making mechanical goods, so as to avoid these problems. It would be advantageous to be able to use lower Mooney nitrile rubbers with improved green strength.

There is now provided a synthetic rubber composition of improved green strength, comprising a rubbery polymer of a $C_4$ - $C_6$ conjugated diolefin (e.g. butadiene) or a rubbery polymer thereof with a $C_8$ - $C_{10}$ vinyl or vinylidene substituted aromatic hydrocarbon (e.g. styrene) or with a $C_3$ - $C_5$ vinyl compound having a nitrile group (e.g. acrylonitrile), having from about 0.5 millimoles per hundred grams of polymer of bound tertiary amine groups in the polymer molecule, the polymer having been reacted with a dihalogen compound of general formula

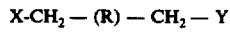

X-CH$_2$ — (R) — CH$_2$ — Y where X and Y each represent chlorine, bromine or iodine, and R represents a mononuclear aromatic group containing one CH$_2$—X group or methoxy group substituent or a poly-nuclear aromatic group selected from biphenyl, diphenyl ether, diphenyl thioether, diphenyl alkane in which the alkane residue has from 1 - 4 carbon atoms, and naphthalene, the aromatic groups of the poly-nuclear aromatic group being unsubstituted or substituted by one or more groups selected from lower alkyl, lower alkyl halide, aryl or lower alkenyl, the groups X—CH$_2$ and CH$_2$—Y being associated with a separate nucleus of the poly-nuclear aromatic group and being linked directly to said nucleus.

The dihalogen compounds used herein have two halogen groups located in the molecular structure of the compound in conjugated relationship to an aromatic nucleus, which is an activating group. Preferably, the halogen groups are located as remotely as possible from each other in the molecular structure of the compound.

It has been found that such compounds have a suitable degree of reactivity with tertiary amine groups combined in the synthetic rubbery polymers, to form crosslinks rapidly between the polymer chains by reaction of the halogen groups with the tertiary amine groups. They react quickly in this manner to set up the crosslinks, forming what are believed to be quaternary ammonium salts with the tertiary amine groups. However, the crosslinks so formed are labile in nature, and reversible, as previously described. The rubber processes under normal shear and elevated temperatures, on a rubber mill or in a Banbury mixer, as a normal synthetic rubber, the crosslinks being reformed on cooling to room temperature, to confer high green strength on the rubber when cool. The green strength at room temperature and at temperatures up to about 50° C of the composition according to the invention is much improved as compared with conventional synthetic rubbers, whilst the other known properties of the basic polymers are not significantly affected. Moreover, the presence of the residues in the rubber compositions, of the crosslinking agents according to the present invention, does not deleteriously affect the curing characteristics of the rubber on subsequent vulcanization, to any significant extent. The factory processability of the rubber compounds is essentially unaffected. The labile crosslinks are thus quite different in nature from the permanent crosslinks formed on curing the rubber, e.g. with sulphur and accelerators.

Specific examples of useful dihalogen compounds in the present invention are the following:

4,4'-Bis (chloromethyl) diphenyl ether

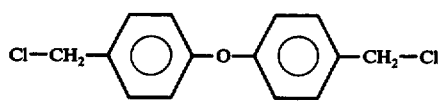

4,4'-Bis(bromomethyl) diphenyl ether

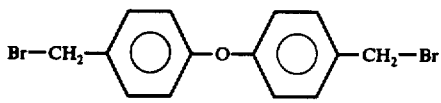

di(bromomethyl)-anisole

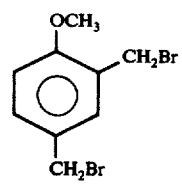

2,6,-bis(bromomethyl) naphthalene

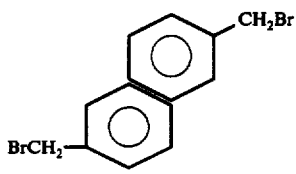

4,4'-Bis(bromomethyl) diphenyl methane

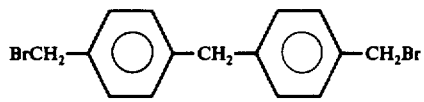

4,4'-Bis(bromomethyl) diphenyl

Tribromo mesitylene

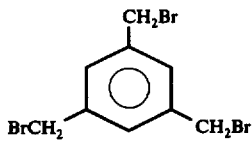

2,2',4,4'-tetrakis(bromomethyl)diphenyl ether

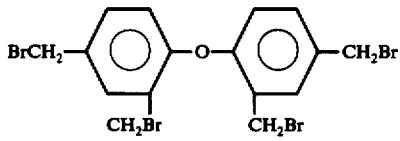

Dibromo and dichloro crosslinking agents are generally to be preferred to di-iodo compounds, at least partially on grounds of cost. Dibromo compounds appear to be more efficient crosslinking agents, in general than the corresponding dichloro compounds.

The use of the dihalogen crosslinkers defined herein shows significant advantages over the use of previously proposed dihalogen crosslinkers such as dibromobutene-2. They have a much less irritating odour, and a lower vapour pressure combined with higher melting point, so that they are convenient and acceptable to work with under commercial rubber manufacturing conditions. Their reduced vapour pressure means that, under conditions of factory preparation and handling of the rubber compositions according to the present invention, much less of the dihalogen compound is vapourized and therefore present in the atmosphere. In addition to this, the vapour itself is much less irritant, so that in the working environment such compounds are much to be preferred to dibromobutene-2. Furthermore, the crosslinkers according to the present invention surprisingly show a much greater efficiency of reaction with the rubbery polymers under latex coagulation conditions, and on mixing with the dry rubber as compared with dibromobutene-2. It is possible that certain of the disadvantages of the previously proposed dihalogen crosslinkers might be overcome by means such as encapsulation of the dihalogen compound so that it is only released at a suitable stage of mixing of the rubber.

Compositions of such reacted polymers and conventional rubber compounding ingredients have the required green strength for use in radial tire manufacture without the necessity of blending in any natural rubber, and for use in manufacture of hose pipe without resorting to the use of high Mooney polymers. The other known properties of the polymers are not significantly affected. Also, the factory processability of the compounds is essentially retained.

Examples of suitable conjugated diolefin polymers to which the present invention is applicable include polybutadiene polyisoprene and rubbery copolymers of at least one conjugated diolefin selected from butadiene-1,3; isoprene; piperylene; and 2,3-dimethyl-butadiene-1,3; with at least one monomer selected from styrene; α-methyl-styrene; and the vinyl toluenes and from acrylonitrile and methacrylonitrile. The preferred polymers for use in the present invention are rubbery copolymers of butadiene and styrene (SBR) and rubbery copolymers of butadiene and acrylonitrile (NBR), and so further detailed description of the invention will have specific reference to these copolymers.

The preferred rubbery copolymer of butadiene and styrene used in the present invention has a bound butadiene content of from 60–85% by weight, and a bound styrene content of from 40–15% by weight, largely in accordance with normal SBR used in tire and general goods manufacture. The most preferred such copolymers are those having 70–82% by weight bound butadiene content and 30–18% by weight bound styrene content.

The preferred NBR copolymers used in the present invention are rubber copolymers containing from about 50–80% by weight bound butadiene content and from about 20–50% by weight bound acrylonitrile content. These copolymers also are largely in accordance with normal NBR used in mechanical goods manufacture. The most preferred such copolymers are those having from 60–75% by weight bound butadiene content and from 25–40% by weight bound acrylonitrile content.

The tertiary amine groups are conveniently introduced by copolymerizing with the butadiene and styrene or acrylonitrile a small amount of a copolymerizable monomer having tertiary amine groups in the molecule, which amine groups are substantially unaffected by the polymerization. Preferably, the amine monomer is one which copolymerizes readily with butadiene and styrene or acrylonitrile in a conventional emulsion polymerization system, and which has a copolymerization reactivity similar to that of the copolymerizing monomers. With such a preferred monomer, a copolymer is obtained with tertiary amine groups distributed along and amongst the polymer chains.

Examples of classes of suitable monomers are:

1. Acrylates and methacrylates of general formula

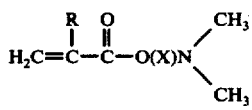

where R represents H or CH$_3$, and X represents an aliphatic hydrocarbon group of 2–4 carbon atoms or a secondary or tertiary amine substituted aliphatic hydrocarbon of 2–4 carbon atoms. Specific preferred members of this class are dimethylaminoethyl acrylate and dimethylaminoethyl methacrylate.

2. Amino alkyl esters of unsaturated dibasic acid, e.g.

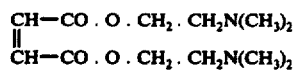

The polymers are conveniently produced by aqueous emulsion polymerization, in accordance with normal methods, i.e. at a pH of 7–11 using a free radical initiator system. The distribution of the tertiary amine groups along and among the polymer molecules can be influenced by the means of addition to the polymerization system of the amine group containing monomer. The amine monomer may be added together with the other polymerizable monomers, before the polymerization is started, in which case the amine groups tend to be concentrated in the lower molecular weight polymer molecules. The amine monomer may be added toward the end of the polymerization in which case the amine groups tend to be found in the higher molecular weight polymer molecules. The amine monomer may be added incrementally during the polymerization whereby the amine groups tend to be randomly distributed along and amongst the polymer molecules, this generally being the preferred method of addition.

After polymerization, the polymer is reacted with the dihalogen crosslinker. It is convenient to add the halogen crosslinker to the polymerization latex, after termination of the polymerization, i.e. at the coagulation stage. Coagulation commonly takes place by adding to the polymerization latex a mixture of acid and electrolyte, e.g. brine/acid, or an acidic electrolyte such as calcium chloride, one effect of which addition is to lower the pH of the latex to the acid range. Oil or plasticizer is commonly added at this stage also, to make an oil extended or plasticized rubber. The halogen crosslinker is preferably added to the latex at the coagulation stage, under acidic pH conditions, i.e. after at least a part of the brine/acid or electrolyte addition, so as to minimize the risk of hydrolysis of the halogen crosslinker. Conveniently, the crosslinker may be added as a solution or dispersion in mineral oil.

The dihalogen crosslinkers defined herein undergo fast and efficient chemical reaction with the tertiary amine group containing polymer under these coagulation conditions. Such fast reaction of the dihalogen compound is advantageous. It ensures rapid chemical bonding of the halogen compound to the polymer, and thereby reduces the chances of losses of the compound from the reaction mixture by vapourization prior to reaction. More efficient and controllable utilization of the halogen crosslinker is thereby achieved.

In addition, the halogen compound can also be added to the polymer after its recovery from the latex, such as during the drying of the rubber or during a milling operation in the process of preparing the rubber for packaging. Alternatively, the halogen compound may be added to the polymer along with other compounding ingredients, e.g. on a rubber mill or in an internal mixer.

The halogen containing organo compounds are compounds containing two or more halogen atoms capable of forming quaternary ammonium salts with the tertiary amine groups of the polymer.

The theoretical basis of the present invention has been tentatively established only, and it is not intended that the invention should be limited by any theoretical considerations. It appears that the tertiary amine groups on the copolymer react with halogen groups on the polyhalo compound to form some kind of labile bonds, associations or crosslinks between the polymer chains. This "labile crosslinking" is responsible for the increase in green strength of the compounds. However, on processing, the rubber compounds, e.g. on mixing, milling, extruding, etc. these labile crosslinks are broken, perhaps due to the high shearing and/or the temperatures encountered in such operations, so that the rubber compound based on the copolymer processes as a normal polymer, even though the temperatures encountered are well below those normally required to cause the decomposition of more simple but comparable low molecular weight compounds. These labile crosslinks appear to be reversible, so that when the compound cools down again after processing, the labile crosslinks re-form and the high green strength of the compound is recovered. They are thus different in chemical nature and stability from crosslinks formed on curing the rubber, e.g. with sulphur and accelerators, which are chemically much stronger and essentially irreversible.

In accordance with this theoretical explanation, it has been found that the types of groups attached to the polymer chain and the types of groups on the halogen compound which react therewith are important. Thus it is necessary that the polymer have tertiary amine groups attached thereto, and that these react with halogen groups, especially bromide or chloride groups, to form quaternary ammonium salts. It also appears that lower molecular weight halogen compounds form labile crosslinks more quickly than higher molecular weight compounds.

The amounts of tertiary groups in the polymer and the amount of halogen compound crosslinker, in relation to each other and to the overall amount of polymer, are significant. It is desirable to have approximate chemical equivalence of tertiary amine groups and halogen groups on the halogen compound. However, one can if desired use a polymer containing a relatively large amount of bound tertiary amine groups, and use only small amounts of halogen compound required to give the necessary amount of labile crosslinks for the improved green strength required. By having a known excess of tertiary amine groups in the polymer, one can then control the desired green strength by adding controlled amounts of halogen compound. For economic reasons, however, large excesses of either material should be avoided. Preferred amounts of the halogen compound are such that it contains at least 0.1 and not more than 10 millimoles of halogen groups per 100 grams of polymer, and the most preferred amount of halogen compound is that which contains from 2.5 – 7.5 millimoles of halogen groups per 100 grams of polymer.

The amount of tertiary amine groups on the polymer is relatively small, in the range of from about 0.5 millimoles to about 10 millimoles, preferably from about 0.75 millimoles to about 7.5 millimoles and most preferably from about 2.5 to about 7.5 millimoles, of tertiary amine groups per 100 grams polymer. The minimum is dictated by the requirement that satisfactory green strength be achieved in the rubber composition, by the formation of at least a minimum number of labile crosslinks. The maximum amount is somewhat more flexible. However, it is necessary to ensure that too many labile crosslinks are not formed, otherwise the Mooney viscosity of the rubber composition will become so high that the easy factory processability of the compound is lost.

The most preferred tertiary amine group containing monomer for use herein is dimethylaminoethyl methacrylate. This monomer is best incorporated in the rubbery polymer in amounts from about 0.1 to about 1.2 parts by weight per 100 parts by weight of polymer.

The tertiary amine group containing polymers used herein are solid elastomeric materials of high molecular weight, preferably having a Mooney viscosity (M/L 4' at 100° C) of about 20 to about 150. They can be milled, extruded or otherwise processed with or without the conventional compounding ingredients, i.e. fillers such as carbon black, clay, silica, calcium carbonate and titanium dioxide, plasticizers and extender oils, tackifiers, antioxidants and vulcanizing agents such as organic peroxides or the well known sulphur vulcanization systems which generally contain a mixture of about 1-5 parts of sulphur per 100 parts of polymer (phr) and about 1-5 phr of one or more accelerators selected from any of the known accelerator classes. Representative examples of such accelerators are an alkyl benzothiazole sulphenamide, a metal salt of a dihydrocarbyl dithiocarbamate, 2-mercapto benzothiazole, 2-mercapto imidazoline. The amounts of filler may vary between about 20 and 150 parts, and extender oil between about 5 and 100 parts, per 100 parts of polymer. The well known compounding and vulcanization technology may be used for these polymers.

The rubber and compounding ingredients can be mixed on a mill or in a Banbury mixer, or in two or more stages using a Banbury followed by mill mixing of the curatives. The components added to the mill or mixer may also include the halogen compound. In accordance with known procedures, the hydrocarbon mineral oil and/or the carbon black may be added to the rubber at the latex stage, i.e. after polymerization and prior to coagulation and recovery of the rubber. The reaction with the halogen compound can take place in the presence of oil and carbon black. After thorough mixing in the normal way, the rubber compound can be extruded into a tire tread, applied to a tire carcass and cured.

The composition may include a mixture of the SBR or NBR polymer described herein and another synthetic rubber, such as a regular SBR or polybutadiene or a regular NBR, and the improved green strength properties are observed.

Aspects of the invention will be further described with reference to the following illustrative specific examples.

EXAMPLE 1

A rubbery polymer was prepared by polymerizing a monomer mixture of 71 parts by weight of butadiene-1,3, 28 parts by weight of styrene and 1 part by weight of dimethylaminoethyl methacrylate. The monomer mixture was emulsified in a stirred 40 gallon reactor, in 185 parts by weight of a 3% aqueous solution of a sodium salt of a rosin acid. The reaction was carried out at about 7° C in the presence of a redox catalyst, to about 60% conversion. On completion of the polymerization, the residual monomers were stripped from the latex in the conventional manner.

Portions of this polymer latex were used in the subsequent example, for reaction with the various dihalogen crosslinking agents and testing of the rubber so formed.

EXAMPLE 2

A series of dihalogen crosslinking agents in accordance with the present invention were added to different portions to the latex of Example 1 and the latices were coagulated, and the rubbers isolated, dried and tested.

The coagulation procedure took place in two stages. The latex and a hydrocarbon mineral oil was added to a sulphuric acid/brine mixture, and further sulphuric acid was added under agitation, to lower the pH of the latex from about 11 to about 8. Then in a second stage, the dihalogen crosslinker, as a 10% solution in the hydrocarbon mineral oil, and additional sulphuric acid, was added to reduce the pH to about 4 to complete the coagulation. The temperature of the latex, during both stages, was about 60° C. The total amount of oil added was 37.5 parts per hundred rubber (phr).

The mixture was agitated for about 20 minutes, the rubber crumb separated in the normal way, washed twice with water and then dried. The Mooney viscosity of the rubber compositions was measured at various times and after various degrees of aging, to observe the effect of the dihalogen crosslinker.

A first control experiment was performed, in which the polymer was not reacted with any dihalogen crosslinker, but was mixed with the same amount of oil. This rubber had a Mooney viscosity (ML-4 at 100° C) of 47.

In each of the experiments according to the invention, the amount of dihalogen crosslinking agent required to be added to raise the Mooney of the rubber to 70 - 78 was determined. A second control experiment was run in which the previously proposed dihalogen crosslinker dibromobutene-2 was used, in an amount sufficient to raise the Mooney to the same level. The amounts of the various dihalogen crosslinkers required to cause the same rise in Mooney were compared, to determine the relative efficiencies of the crosslinkers under these conditions.

The relative molar efficiency of the crosslinkers was determined by taking the amount of crosslinker, in parts per hundred of rubber hydrocarbon, required to raise the Mooney the given approximate amount, and dividing this by halogen equivalent weight of the compound (which is, of course, half the molecular weight of the compound, in the case of a dihalogen compound). Then the control compound dibromobutene-2 is assigned the valve 1, and the others are expressed in relation to it, to give relative molar efficiency.

The rate of development of green strength in the composition was followed by measuring Mooney viscosity at various times. To determine a final Mooney, samples of the rubber crumb recovered from the latex were dried at 65° C for 2 hours, maintained at 60° C in an atmosphere of nitrogen overnight, massed, stored at 60° C for between 24 hours and 5 days until the Mooney had reached a steady value and then tested for Mooney in the normal way. To determine the Mooney after process completion, the recovered latex was dried as above and maintained at 60° C in an atmosphere of nitrogen overnight, and the rubber crumb was then massed and the Mooney value determined. The table shows the Mooney after process completion expressed as a percentage of the final Mooney, which is a measure of the speed of development of green strength with time.

The results are given in Table 1.

EXAMPLE 3

A rubbery polymer of butadiene, styrene and dimethylaminoethyl methacrylate was prepared as in Example 1. The polymer was mixed with 37.5 parts by weight of hydrocarbon oil per 100 parts by weight of polymer and was recovered from the latex and contained 23 weight % of styrene and 0.8 weight % of dimethylaminoethyl methacrylate.

Finally, the product was removed from the press, and compounded in the rotary mixer together with sufficient carbon black to be equivalent to 50 parts by weight per 100 parts by weight of polymer and mixed at 100° C and 100 rpm for 3 minutes. The compound was formed into a sheet on a rubber mill, put in a press for 10 minutes at 100° C and then allowed to cool to room temperature and stored for 24 hours. Standard dumbbells were cut from the sheet and the green strength was

TABLE 1

| Compound Reference | Cross-linking Agent | Amount of Cross-linker added (phr) | Relative Molar Efficiency of Cross-linker | Final Mooney | % of Final Mooney after Process completion |
|---|---|---|---|---|---|
| 1 (control) | — | — | — | 47 | — |
| 2 (control) | Dibromobutene-2 | 0.42 | 1 | 70 | 100 |
| 3 | 4,4'-Bis(chloromethyl) diphenyl ether | 0.366 | 1.363 | 76.5 | 20 |
| 4 | 2,6-bis(bromomethyl) naphthalene | 0.25 | 2.38 | 72 | 100 |
| 5 | 4,4'-Bis(bromomethyl) diphenyl ether | 0.20 | 3.35 | 70 | 100 |
| 6 | 4,4'-bis(bromomethyl) diphenyl methane | 0.18 | 3.64 | 71 | 100 |
| 7 | 4,4'-bis(bromomethyl) diphenyl | 0.165 | 3.77 | 71 | 100 |

In order to establish the processing characteristics of the polymer, samples were treated with dihalogen compounds and submitted to an aging treatment to assess the development of the green strength with time as measured by the Mooney change and then to a treatment in an internal mixer followed by re-assessment of the green strength.

A sample of the polymer was put onto a rubber mill maintained at 50° C and the dihalogen compound, of type and amount shown in Table 2, was added and mixed thoroughly into the rubber, which was then sheeted off the mill. The Mooney of this product was measured as the zero time Mooney. The product was put into a press maintained at 100° C and the Mooney was measured at various time intervals shown in Table 2. The product after 5 hours in the press was removed, allowed to cool to room temperature and then put into the mixing chamber of a rotary mixer (Brabender) maintained at 100° C where the rotor was operated at 100 rpm for 5 minutes. The product was removed, combined with other samples that had been so treated in the mixer, put onto a rubber mill and formed into a coherent sheet. After cooling to room temperature, the Mooney was again measured and the product put back into a press maintained at 100° C with samples being removed at various time intervals as shown in Table 2. After 5 hours in the press, the product was removed and put through a repeat of the rotary mixer procedure and press heating procedure.

directly measured using an Instron tester. The results are shown in Table 2.

In all instances the Mooney was a four minute Mooney measured at 100° C.

The results show that the products exhibit little change in Mooney values after 5 hours in the press and have high levels of green strength at room temperature and even at 50° C.

EXAMPLE 4

The rubbery polymer of Example 3 was mixed on a rubber mill maintained at 50° C with the dihalogen compounds shown in Table 3. The mixtures were then sheeted off the mill. The Mooney was measured on a sample of the mixture. The remaining mixture was put into a press at 100° C and samples removed at various time intervals and the Mooney was determined thereon. The Mooney measurements were for four minutes at 100° C.

The results in Table 3 show that the dihalogen compounds herein disclosed react rapidly with the tertiary amine group containing polymer to develop green strength as measured by the increase in Mooney.

EXAMPLE 5

Using standard emulsion polymerization techniques a rubbery polymer was prepared of butadiene, acrylonitrile and dimethylaminoethyl methacrylate. On completion of the polymerization the unreacted monomers were stripped from the latex.

Table 2

| Experiment # | 1 | 2 | 3 |
|---|---|---|---|
| Dihalogen compound | 4,4'-Bis (chloromethyl) diphenyl ether | 4,4'-bis- (bromomethyl) -diphenyl ether | 4,4'-bis- (bromomethyl) -diphenyl methane |
| Grams of dihalogen compound per 100g of polymer | 0.187 | 0.25 | 0.246 |
| Zero time Mooney | 33 | 34 | 34 |
| Product put in press at 100° C | | | |
| Mooney/time (hrs.) | 33/0.5 | 70/0.5 | 79/0.5 |
| Mooney/time (hrs.) | 39/2 | 79/2 | 79/1.75 |
| Mooney/time (hrs.) | 44/3 | 78/3 | 79/3 |
| Mooney/time (hrs.) | 51/5 | 77/5 | 79/5 |
| Product treated in | | | |

Table 2-continued

| Experiment # | 1 | 2 | 3 |
|---|---|---|---|
| mixer | | | |
| Zero time Mooney Product put in press at 100° C | 36 | 56 | 63 |
| Mooney/time (hrs.) | 45/1.5 | 56/0.75 | 66/1 |
| Mooney/time (hrs.) | 48/3 | 58/3.5 | 66/2 |
| Mooney/time (hrs.) Product treated in mixer | 54/5 | 56/5 | 66/5 |
| Zero time Mooney Product put in press at 100° C | 35 | 43 | 47 |
| Mooney/time (hrs.) | 43/1.5 | 46/1 | 53/0.75 |
| Mooney/time (hrs.) | 46/3 | 47/3.5 | 55/3.5 |
| Mooney/time (hrs.) | 51/5 | 49/5 | 56/5 |
| Green Strength | | | |
| Strength (room temp) at | | | |
| 100% elongation | 4.0 | 3.8 | 3.7 |
| 200% elongation | 4.1 | 4.0 | 3.6 |
| 300% elongation | 4.1 | 5.0 | 3.6 |
| 400% elongation | 3.8 | 6.0 | 3.6 |
| 500% elongation | 3.5 | 6.2 | 3.4 |
| Elongation at break | 700 | 670 | 710 |
| Strength (50° C) at | | | |
| 100% elongation | 2.5 | 2.6 | 2.0 |
| 200% elongation | 2.5 | 4.0 | 2.0 |
| 300% elongation | 2.2 | 4.8 | 2.0 |
| 400% elongation | 2.2 | 4.8 | 2.0 |
| 500% elongation | 2.2 | 4.8 | 2.0 |
| Elongation at break | 320 | 390 | 720 |

Table 3

| Experiment # | 1 | 2 | 3 | 4 | 5 | 6 | 7 |
|---|---|---|---|---|---|---|---|
| Dihalogen compound | Bis(chloromethyl) diphenyl ether | Bis(chloromethyl) diphenyl ether | 2,6 Bis(bromomethyl) naphthalene | Bis(bromomethyl) diphenyl methane | Bis(bromomethyl) diphenyl | Control 1,4-Di bromobutene-2 | Control α,α'-dibromo-p-xylene |
| Grams of dihalogen cpd./100g polymer | 0.187 | 0.366 | 0.22 | 0.125 | 0.22 | 0.15 | 0.185 |
| Mooney/time in press (hrs) | 33/0 | 33/0 | 32/0 | 33/0 | 35/0 | 42/0 | 34/0 |
| | 33/0.5 | 37/1.25 | 66/1 | 66/1 | 67/1.5 | 69/1 | 68/0.5 |
| | 39/2 | 50/3 | 71/2 | 71/2 | 68/3.25 | 74/2.5 | 74/2 |
| | 44/3 | 59/5 | 69/6 | 72/5 | 68/5 | 74/5 | 76/5 |
| | 53/5 | | | | | | |

The latex and a 10 weight per cent solution in di-octyl phthalate of the cross-linkers shown in Table 4 the amount of cross-linkers being 0.065 parts by weight per 100 parts by weight of rubber and the total amount of di-octyl phthalate being about 1% by weight of the rubber, were added to a calcium chloride solution maintained at 60° C. The coagulated polymer was separated, dried at 65° C for 2 hours and left overnight under nitrogen at 60° C. The polymer contained about 34 weight per cent of acrylonitrile and about 2 weight per cent of dimethylaminoethyl methacrylate.

The polymer was massed on a rubber mill and a sample used for Mooney determination. A further sample was mixed on a cool mill with 50 parts of carbon black per 100 parts by weight of polymer and sheeted off. The sheets were pressed to a standard thickness and were then aged at room temperature for 24 hours. Specimens were cut from the sheets and tested for green strength.

The results are shown in Table 4. Experiment 1 is a control using cross-linkers previously disclosed. It is clear that the present cross-linkers yield high levels of green strength both at room temperature and at 50° C while not showing such a high Mooney value as the control experiment. Furthermore, the molar quantity of the present cross-linkers required to give the green strength is less than that used for the control.

Odour and lachrymatory problems found when using the cross-linker of the control were essentially completely eliminated when using the cross-linkers of the present invention.

Table 4

| Experiment # | 1 (Control) Dibromo-m-xylene | | 2 4,4'-bis (bromomethyl) diphenyl methane | | 3 4,4'-bis (bromomethyl) diphenyl ether | | 4* 4,4'-bis (bromomethyl) diphenyl ether | |
|---|---|---|---|---|---|---|---|---|
| Crosslinker | | | | | | | | |
| Mooney ML 4 at 100° C | 92 | | 72 | | 70 | | 74 | |
| Green Strength | | | | | | | | |
| Strength at | 25° C | 50° C | 25° C | 50° C | 25° C | 50° C | 25° C | 50° C |
| 100% elongation kg/cm$^2$ | 23 | 11.5 | 22 | 12 | 20 | 10.5 | 22 | 12.5 |
| 200% elongation kg/cm$^2$ | 34 | 16.5 | 33 | 16.5 | 25 | 14 | 29 | 14 |
| 300% elongation kg/cm$^2$ | 40 | — | 39 | — | 29 | — | 30 | 11.5 |
| 400% elongation kg/cm$^2$ | 40 | — | 39 | — | 29 | — | 28 | — |

*Crosslinker added as 10% solution in tri(butoxyethyl) phosphate.

EXAMPLE 6

The oil extended polymer of Example 1 was coagulated, recovered and dried, the Mooney of the polymer being ML 4 at 100° C = 42. The polymer was mixed in a Banbury together with 0.25 parts by weight per 100 parts by weight of rubber of the dihalogen compound 4,4'-bis (bromomethyl)diphenyl ether; at the completion of the mixing cycle the temperature of the mix was 290° F (143° C). After resting at room temperature for 3 hours, the Mooney of the green strength polymer was ML 4 = 64.

The green strength polymer was mixed in a Banbury at about 280° F (138° C) with the following materials:

| | |
|---|---|
| Green strength polymer | 278 |
| Natural rubber | 337 |
| Polybutadiene | 131 |
| Carbon black | 269 |
| Zinc oxide | 32.2 |
| Stearic acid | 10.1 |
| Antioxidant | 10.1 |
| Tackifying agent | 13.5 |
| Bonding resin | 13.5 |

After cooling this mixture was mixed with the curvative system on a cool (about 28° C) mill, refined and sheeted off. The curative system used was:

| | |
|---|---|
| Crystex sulphur(20%) | 20 |
| N-cyclohexyl-2-benzo-thiazole sulphenamide | 6 |
| Diphenyl guanidine | 1.3 |
| Bonding agent | 6.7 |

Samples of this completely compounded system were set aside for green strength determination and other samples were cured and the vulcanizate properties were determined.

A regular SBR was similarly compounded, as a control.

The results are given in Table 5.

Table 5 shows that the compounded system containing the green strength polymer of the present invention has a significantly improved green strength which makes it most suitable for use in radial tire construction. The properties of the corresponding vulcanizate are essentially indistinguishable from the properties of the control.

Table 5

| | | Green Strength Polymer | Control |
|---|---|---|---|
| Green strength (after aging 24 hours at room temperature) | | | |
| Strength at | | | |
| 100% elongation | kg/cm² | 2.7 | 2.3 |
| 200% | kg/cm² | 3.0 | 1.9 |
| 300% | kg/cm² | 3.4 | 1.8 |
| 400% | kg/cm² | 3.6 | 1.7 |
| 500% | kg/cm² | 3.7 | 1.6 |
| 600% | kg/cm² | 3.7 | 1.6 |
| Vulcanizate properties (cure 25 minutes at 145° C) | | | |
| Hardness | Shore A | 56 | 52 |
| Tensile strength | kg/cm² | 203 | 205 |
| Elongation | % | 470 | 500 |
| 100% Modulus | kg/cm² | 23 | 20 |
| 300% Modulus | kg/cm² | 113 | 104 |
| Goodrich heat build-up | ° C | 10 | 10 |
| Dunlop rotary at | 25° C | 2.53 | 2.55 |
| Power loss | 50° C | 2.13 | 2.10 |
| | 75° C | 1.73 | 1.73 |
| | 100° C | 1.46 | 1.52 |

What is claimed is:

1. An improved process of preparing a synthetic rubber composition of improved green strength which comprises reacting a rubbery polymer of a $C_4$-$C_6$ conjugated diolefin or a rubbery polymer thereof with a $C_8$-$C_{10}$ vinyl or vinylidene substituted aromatic hydrocarbon or with a $C_3$-$C_5$ vinyl compound having a nitrile group, the rubbery polymer having from about 0.5 millimoles to about 10 millimoles per 100 grams of polymer of bound tertiary amine groups therein, with a halogen compound, the improvement being that the halogen compound is of general formula $$X—CH_2—R—CH_2—Y$$

wherein X and Y each represent chlorine, bromine, or iodine, and R represents a mononuclear aromatic group containing one $CH_2$—X group or a methoxy group substituted or a polynuclear aromatic group selected from diphenyl, diphenyl ether, diphenyl thioether, diphenyl alkane in which the alkane residue has from 1–4 carbon atoms, and naphthalene, the aromatic groups of the polynuclear aromatic group being unsubstituted or substituted by one or more groups selected from lower alkyl, lower alkyl halide, aryl or lower alkenyl, the groups X—$CH_2$ and $CH_2$—Y being associated with a different nucleus of the polynuclear aromatic group, and being linked directly to said nucleus 2. The process of claim 1 wherein the halogen compound is selected from 4,4'-bis(chloromethyl)diphenyl ether, 4,4'-bis(bromomethyl)diphenyl ether, 2,6-bis (bromomethyl)-naphthalene, 4,4'-bis(bromomethyl)-diphenyl methane, 4,4'-bis(bromomethyl)diphenyl, tribromo mesitylene, 2,2',4,4'-tetrakis(bromomethyl)-diphenyl ether, and di(bromomethyl) anisole.

3. The process of claim 2 wherein the rubbery polymer contains from 70–82 parts by weight of bound butadiene, from 30–18 parts by weight of bound styrene and from 0.1–1.2 parts by weight of bound dimethylaminoethyl methacrylate.

4. The process of claim 2 wherein the rubbery polymer contains from 50–80 parts by weight of bound acrylonitrile and from 0.1–1.2 parts by weight of bound dimethylaminoethyl methacrylate.

5. The process of claim 2 wherein the amount of halogen compound is such that it contains from 0.1 to 10 millimoles of halogen groups per 100 grams of polymer.

6. The process of claim 5 wherein the rubbery polymer is reacted with the halogen compound in the polymerization latex.

7. The process of claim 5 wherein the rubbery polymer is recovered from the polymerization latex and then reacted with the halogen compound.

8. An improved synthetic rubber composition of improved green strength which comprises a rubbery polymer of a $C_4$-$C_6$ conjugated diolefin or a rubbery polymer thereof with a $C_8$-$C_{10}$ vinyl or vinylidene substituted aromatic hydrocarbon or with a $C_3$-$C_5$ vinyl compound having a nitrile group, the rubbery polymer having therein from 0.5 to 10 millimoles, per 100 grams of polymer, of bound tertiary amine groups, the rubbery polymer having been reacted with a halogen compound, the improvement being that the halogen compound is of general formula $$X—CH_2—CH_2—Y$$

wherein X and Y each represent chlorine, bromine or iodine, and R represents a mononuclear aromatic group containing one $CH_2$—X group or methoxy group substituent, or a polynuclear aromatic group selected from diphenyl, diphenyl ether, diphenyl thioether, diphenyl alkane in which the alkane residue has from 1-4 carbon atoms, and naphthalene, the aromatic groups of the polynuclear aromatic group being unsubstituted or substituted by one or more groups selected from lower alkyl, lower alkyl halide, aryl or lower alkenyl, the groups X-CH$_2$ and CH$_2$-Y being associated with a different nucleus of the polynuclear aromatic group, and being linked directly to said nucleus.

9. The composition of claim 8 wherein the halogen compound is selected from 4,4'-bis(chloromethyl)-diphenyl ether, 4,4'-bis(bromomethyl)diphenyl ether, 2,6-bis(bromomethyl)-naphthalene, 4,4'-bis(bromomethyl)diphenyl methane, 4,4'-bis(bromomethyl)diphenyl, tribromomesitylene, 2,2',4,4'-tetrakis(bromomethyl)-diphenyl ether, and di(bromomethyl) anisole.

10. The composition of claim 9 wherein the amount of halogen compound is such that it contains from 0.1 to 10 millimoles of halogen groups per 100 grams of polymer.

11. The composition of claim 10 wherein the rubber polymer contains from 70-82 parts by weight of bound butadiene, from 30-18 parts by weight of bound styrene and from 0.1-1.2 parts by weight of bound dimethylaminoethyl methacrylate.

12. The composition of claim 10 wherein the rubber polymer contains from 50-80 parts by weight of bound butadiene, from 20-50 parts by weight of bound acrylonitrile and from 0.1-1.2 parts by weight of bound dimethylaminoethyl methacrylate.

* * * * *